(12) United States Patent
Hockema

(10) Patent No.: US 11,359,361 B1
(45) Date of Patent: Jun. 14, 2022

(54) TRAPLESS TOILET

(71) Applicant: Charles Hockema, Colorado Springs, CO (US)

(72) Inventor: Charles Hockema, Colorado Springs, CO (US)

(73) Assignee: TRAPLESS LLC, Colorado Springs, CO (US)

( * ) Notice: Subject to any disclaimer, the term of this patent is extended or adjusted under 35 U.S.C. 154(b) by 0 days.

(21) Appl. No.: 17/154,534

(22) Filed: Jan. 21, 2021

(51) Int. Cl.
*E03D 1/34* (2006.01)

(52) U.S. Cl.
CPC ........................... *E03D 1/34* (2013.01)

(58) Field of Classification Search
CPC ........................................ E03D 1/34
USPC ........................................ 4/441, 434
See application file for complete search history.

(56) References Cited

U.S. PATENT DOCUMENTS

| | | | |
|---|---|---|---|
| 23,335 A | 3/1859 | Wellington | |
| 244,535 A | 7/1881 | Blackwood, Jr. | |
| 255,975 A | 4/1882 | Hanson | |
| 292,918 A | 2/1884 | Kelly | |
| 365,937 A | 7/1887 | Park | |
| 1,878,613 A * | 9/1932 | Werner | E03D 1/34 4/404 |
| 3,599,248 A * | 8/1971 | Fulton | E03D 11/10 4/438 |
| 3,860,973 A | 1/1975 | Uyeda et al. | |
| 4,032,996 A | 7/1977 | Sargent et al. | |
| 4,624,018 A * | 11/1986 | Kurtz | E03D 1/142 4/325 |
| 4,999,857 A * | 3/1991 | Mohrman | C05F 3/04 4/111.1 |
| 5,201,082 A | 4/1993 | Rockwell | |
| 5,450,634 A * | 9/1995 | Mohrman | E03D 1/145 4/326 |
| 5,657,495 A | 8/1997 | Dufresne | |
| 5,920,920 A | 7/1999 | Chi | |
| 6,070,276 A * | 6/2000 | Yeung | E03D 3/00 4/441 |
| 8,176,577 B2 | 5/2012 | Grech et al. | |
| 8,918,922 B2 * | 12/2014 | Kido | E03D 1/34 4/324 |
| 9,045,887 B2 | 6/2015 | O'Malley | |

(Continued)

OTHER PUBLICATIONS

International Search Report and Written Opinion issued in Application No. PCT/US2022/013297 dated Feb. 17, 2022.

*Primary Examiner* — Lori L Baker
(74) *Attorney, Agent, or Firm* — Workman Nydegger

(57) ABSTRACT

A toilet has a porcelain body including a tank that defines a first fluid passageway, a bowl integral with the tank and connected with a second fluid passageway that intersects the first fluid passageway, the second fluid passageway is integral with the tank and the bowl, and an outlet located downstream of the intersection of the first fluid passageway and the second fluid passageway, and the outlet includes a seat. The toilet includes a flush mechanism inside the porcelain body and has a weighted stopper configured to contact the seat of the outlet, a flexible connecting element having a first end connected to the stopper, a float connected to a second end of the flexible connecting element, a pull chain having a first end connected to the float, and a rocker arm rotatably connected to the body and connected to a second end of the pull chain.

18 Claims, 3 Drawing Sheets

(56) References Cited

U.S. PATENT DOCUMENTS

| | | | |
|---|---|---|---|
| 9,080,323 B2 | 7/2015 | Grech et al. | |
| 9,181,689 B2 | 11/2015 | Imai et al. | |
| 10,233,623 B2* | 3/2019 | Huang | E03D 1/33 |
| 2007/0245475 A1* | 10/2007 | Goldman | E03D 1/34 |
| | | | 4/378 |
| 2010/0287692 A1* | 11/2010 | Rampen | E03D 5/012 |
| | | | 4/434 |
| 2013/0025040 A1 | 1/2013 | Liu | |
| 2013/0180039 A1* | 7/2013 | Kido | E03D 1/34 |
| | | | 4/378 |
| 2018/0291606 A1* | 10/2018 | Huang | E03D 1/32 |

* cited by examiner

TRAPLESS TOILET

FIELD OF THE INVENTION

Embodiments of the present invention generally relate to plumbing fixtures. More particularly, at least some embodiments of the invention relate to a trapless toilet and associated components.

BACKGROUND

Conventional toilet designs typically incorporate "S" siphon traps (or simply, 'traps'), so called in reference to their 'S' shape, to trap water and thereby keep sewer gas from a connected sewage system from entering the home. When such toilets are not used for an extended time, the water in the trap evaporates, thus allowing sewer gas to enter the home.

Due to the 'S' shape of the trap, one of the biggest challenges in toilet design is avoiding clogging of the trap, and the resultant bowl overflows. Particularly, because movement of solid waste through the 'S' shaped tube of the trap relies on gravity and a siphon effect, the trap often becomes clogged. Conventional overflow pipes in the toilet tank only keep the tank from overflowing during filling, but actually cause the bowl to overflow if the trap is clogged because the overflow water from the tank flows to the bowl.

Moreover, much of the water stored in traditional toilet tanks is required simply to prime the large 'S' shaped siphon, making flushing less efficient. As current designs try to accommodate larger 'S' traps to avoid clogging, siphoning strength is reduced and/or more water is needed to prime the trap.

Another shortcoming with conventional designs concerns the way that toilets are typically installed. Particularly, the way that most bathrooms are configured with a tub/shower, vanity, and toilet, the space between the front of the toilet bowl and the opposing wall is usually the tightest bathroom floor dimension.

Finally, conventional toilets and flush mechanisms typically employ highly complex designs with numerous parts. Because these mechanisms are subject to multiple daily usages, they are prone to failure.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
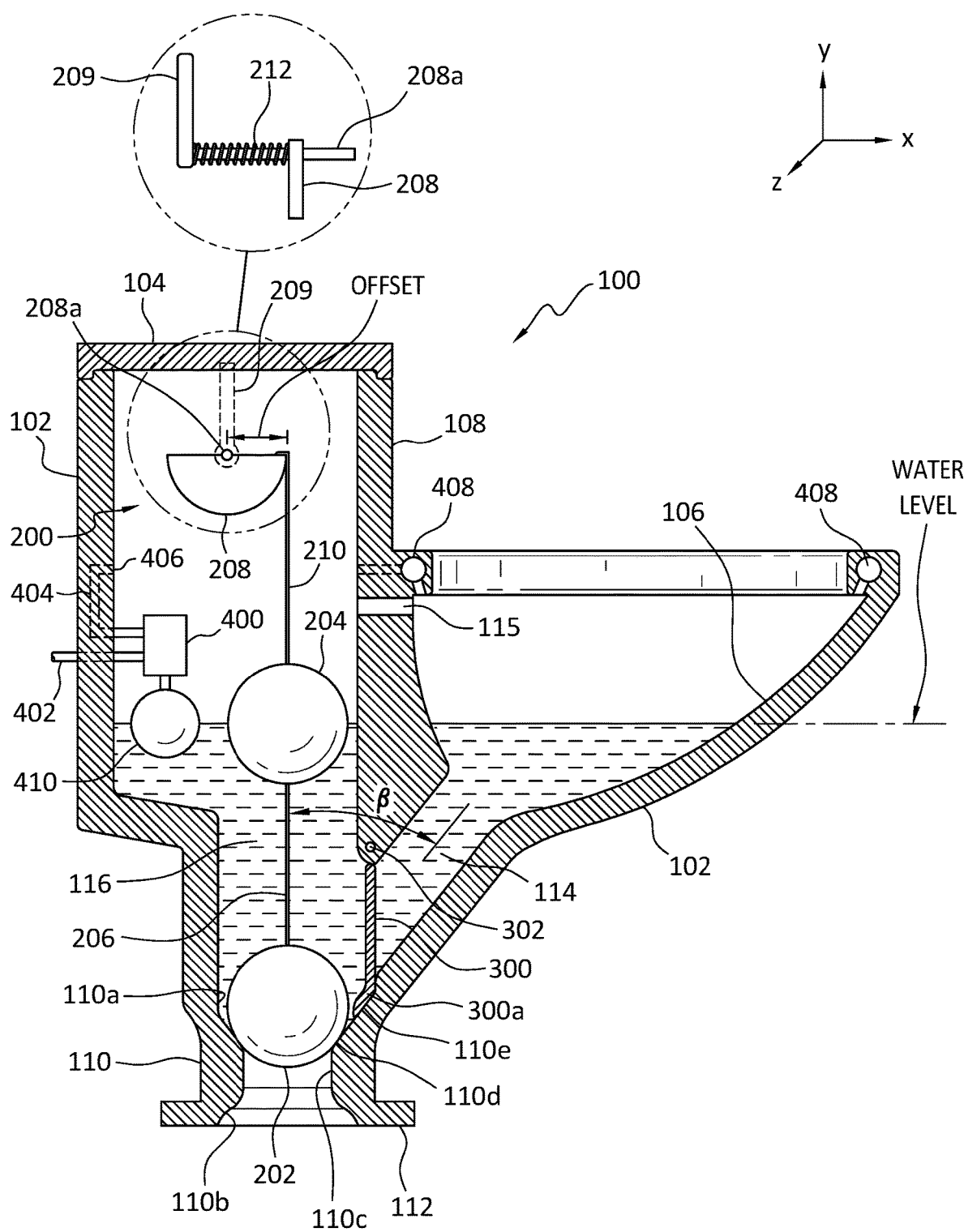
FIG. 1 discloses aspects of an embodiment of a toilet with a flushing mechanism in a 'ready' configuration.

Embodiments of the present invention generally relate to plumbing fixtures. More particularly, at least some embodiments of the invention relate to a trapless toilet, and associated components.

In general, some example embodiments of the invention embrace a trapless toilet that comprises a bowl and a tank that may each be configured for fluid communication with a common outlet of the toilet. Both the bowl and the tank may communicate with the outlet by way of a respective fluid passageway. Each of the fluid passageways may be generally linear in its respective configuration. In at least some embodiments, a default configuration may be incorporated in the toilet in which both fluid passageways are blocked so that fluid communication between the bowl and the outlet, and between the tank and the outlet, is prevented. The default configuration may be selectively modified, such as when a user operates a flush handle of the toilet to at least partly unblock the two fluid passageways, thus allowing the contents of the bowl to pass through the connecting fluid passageway and exit the toilet through the outlet. After flushing, the system may automatically return to the default configuration.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a trapless configuration may be employed that uses only gravity, and not a siphoning effect, to drain the contents of the bowl during the flush cycle. An embodiment may be configured to prevent the backflow of sewage gas through the toilet without the use of a trap. An embodiment may employ a generally straight fluid passageway, leading from the bowl to the outlet, that is relatively less prone to clogging, and easier to clear if a clog occurs, than S-shaped fluid passageways or P-shaped fluid passageways. An embodiment may comprise a relatively straight fluid passageway leading from the bowl to the outlet that may enable materials from the bowl to travel more quickly to the outlet during flushing than if a trap were employed. An embodiment may be relatively simple in terms of its construction and the number of included parts. An embodiment may be configured to prevent bowl overflow. Various other advantages of example embodiments will be apparent from this disclosure.

A. Example Materials

Example embodiments of the invention may employ various different materials in their construction. The body of the toilet, including interior and exterior surfaces, may be made of steel, aluminum, porcelain, ceramic, vitreous china, enamel, or any one or more of these.

The mechanical components of the toilet may be made of any material(s) suitable for the intended use of such components. Materials exposed to water and/or sewage may be made of brass, copper, stainless steel, copper-nickel alloy, aluminum, plastic, rubber, or any one or more of these.

B. Aspects of Some Example Embodiments—Toilet

With attention now to FIG. 1, details are provided concerning a toilet, one example embodiment of which is denoted generally at 100. The example disclosed in the Figures is presented only for the purposes of illustration and is not intended to limit the scope of the invention in any way.

The toilet 100 may comprise a body 102, that may take the form of an integrated single-piece, or unibody, structure, and a tank lid 104. The body 102 may comprise a bowl portion 106, a tank portion 108, and an outlet 110. The outlet 110 may be configured, so as to include an integral flange 112 for example, to mate with corresponding structure, such as a flange 50 (see FIG. 2) of a soil drain, sometimes referred to as a 'black water' pipe. The bowl portion 106 may be connected to the outlet 110 by a fluid passageway 114, and the tank portion 108 may be connected to the outlet 110 by a fluid passageway 116. The bowl portion 106 may include an overflow 115, such as a fluid passageway, which enables fluid to flow from the bowl portion 106 to the tank portion 108 in the event that the water level becomes too high in the bowl portion 106.

As shown in FIG. 1, the fluid passageway 114 and the fluid passageway 116 may intersect with each other upstream of the outlet 110. The intersection of the fluid passageway 114 and the fluid passageway 116 may define a particular angle β, such as in the range of about 35 degrees to about 50 degrees, although no particular angle β is necessarily required.

The fluid passageway 114, which may be disposed at a lower side of the bowl portion 106 and directly connect the bowl portion 106 to the fluid passageway 116 and/or to the outlet 110, may have a straight configuration. The fluid passageway 116 may likewise have a straight configuration. In general, the use of such straight configurations may induce relatively lower pressure losses, and thus improved and faster flow, relative to the higher pressure losses that would be experienced in S-shaped or other bent fluid passageway configurations. Such straight configurations may also reduce the likelihood of clogs since clogs are more apt to occur in fluid passageways that include bends and/or twists.

In the example of FIG. 1, the fluid passageway 114 may have a relatively smaller inside diameter (ID) than an ID of the fluid passageway 116, although such a configuration is not required. In other embodiments, the ID of the fluid passageway 114 may be the same as, about the same as, or larger than, the ID of the fluid passageway 116. Further, the fluid passageways 114 and/or 116 may have generally circular cross-sectional shapes, although that is not necessarily required. Finally, the outlet 110 may have a spool shaped configuration in which its upstream side 110a and downstream side 110b each have a relatively larger ID than the portion 110c of the outlet 110 between the upstream and downstream sides. As noted, the downstream side 110b of the outlet 110 may be configured to mate with a component of a sewage system.

C. Aspects of Some Example Embodiments—Mechanisms

With continued reference to FIG. 1, details are provided concerning a flush mechanism, one example embodiment of which is denoted generally at 200. The flush mechanism 200 may reside in a default or ready state, an example of which is shown in FIG. 1, that is, a state in which both fluid passageways 114 and 116 are blocked and the flush mechanism 200 is ready to perform a flush operation.

In terms of its configuration, the flush mechanism 200 may comprise a stopper 202 which is configured and arranged to be removably positioned on a seat 110d defined by the outlet 110. The stopper 202 and seat 110d may have any suitable complementary configurations. Thus, the stopper 202 may comprise a ball, or spherical, shape configured for substantial contact around the diameter of the seat 110d. In other embodiments, the lower end of the stopper 202 that contacts the seat 110d may have a conical shape, as discussed below.

More generally however, no particular stopper 202 geometry is required. Thus, in other example embodiments, a stopper may take the form of a flapper, which may be made of rigid material such as plastic, or flexible material such as rubber, or the stopper may take the form of a hinged stopper. In still other embodiments, a stopper may comprise a conical portion that is received by the seat 110d, and part of the conical portion may be configured to reside within an outlet when the flushing mechanism is in the ready state, such as the portion 110c of the outlet 110, although such a configuration and arrangement are not necessarily required. These examples illustrate that a stopper is an example structural implementation of a means for plugging an outlet of a toilet. The scope of the invention is not limited to the example disclosure structural configurations but extends, more broadly, to any other structure(s) capable of performing the functionality of such a means for plugging an outlet of a toilet.

The stopper 202 may be weighted to help ensure a good seal between the stopper 202 and the seat 110d when the stopper 202 is in sealing contact with the seat 110d. When positioned on the seat 110d, as shown in FIG. 1, the stopper 202 may perform a number of functions. For example, the stopper 202 may prevent the flow of fluid from the tank 108 or bowl 106 through the outlet 110. As well, the stopper 202 may prevent backflow of sewage gas through the outlet 110 and into the toilet 100, even in a circumstance where the bowl 116 and/or the tank 108 may be empty of any fluid.

As further indicated in FIG. 1, a flapper 300 may be provided that may cooperate with the stopper 202 to limit, or prevent, the movement of solids from the fluid passageway 114 to the fluid passageway 116 when the flapper 300 is disposed as shown in FIG. 1. Thus positioned however, the flapper 300 may nonetheless allow water/fluids to be freely exchanged between the fluid passageway 114 and the fluid passageway 116 so that fluid levels in the tank 108 and bowl 106 may be the same, or become the same, even when the flapper 300 is shut. That is, the flapper 300 does not necessarily have to seal the fluid passageway 114. In other embodiments, the flapper 300 may completely seal the fluid passageway 114 so that fluid/material exchange between the fluid passageways 114 and 116 is prevented. The flapper 300 may be pinned to the body 102 with a pin 302 or other mechanism so that the flapper 300 can rotate over a range of motion to block, or unblock, the fluid passageway 114. The flapper 300 may be configured and arranged so that it is readily displaced from the closed position (shown in FIG. 1) during a flushing operation so that material from the bowl 106 can readily flow out of the bowl 106. Regardless of whether or not the flapper 300 completely seals the fluid passageway 114, or enables the exchange of fluid between the fluid passageway 114 and the fluid passageway 116 as described above, the position of the flapper 300 shown in FIG. 1 may be referred to as constituting a 'closed' position of the flapper 300. That is, mere reference to a 'closed' position of the flapper 300 should not be construed as necessarily implying that the flapper 300 does, or does not, seal the fluid passageway 114. In the closed position, the flapper 300 may or may not, depending upon the embodiment, seal the fluid passageway 114 so that no fluid or solids can exit the fluid passageway 114.

In the blocking, or closed, position, a foot portion 300a of the flapper 300 may contact a seat 110e defined by the outlet 110. As shown the shape of the seat 110e may be complementary to the shape of the foot portion 300a so that the foot portion 300a is able to make substantial contact with the seat 110e when the flapper 300 is in the closed position shown. It is also noted that when in the closed position, the flapper 300 may serve to define a portion of the fluid passageway 116.

It may be desirable to provide a mechanism to ensure reliable retention of the flapper 300 in the closed position until a flushing process is initiated. To that end, the stopper 202 may be configured and arranged to reside adjacent to, and possibly in contact with, the flapper 300 so that movement of the flapper 300 out of the closed position is prevented when the stopper 202 is fully positioned on the seat 110a. The presence of the stopper 202, which may be weighted, on the seat 110a may also help to ensure that the flapper 300 is retained in contact, which may or may not be sealing contact, with the seat 110e until a flush operation has begun. Thus, at the same time that the stopper 202 is in sealing contact with the seat 110, the flapper 300 may be in contact with the seat 110e.

Finally, the flapper 300 may serve to protect the stopper 202 from contact with solid waste exiting the bowl 116. As well, the shape and position of the flapper 300 may help to direct flow from the bowl 106 to the outlet 110.

With continued reference to FIG. 1, the stopper 202 may be connected to a float 204 by a connector 206 that may comprise a chain, cable, or other flexible, non-rigid, configuration. The float 204, in turn, may be connected to a device such as a rocker arm 208 by a pull chain 210 which, like the connector 206, may comprise a chain, cable, or other flexible, non-rigid, configuration. In other embodiments, the connector 206 and/or the pull chain 210 may each be replaced with a respective device that comprises a rigid material, such as a length of brass or aluminum rod stock or flat stock for example. The rocker arm 208 may be connected to a flush handle 209 located on an exterior of the tank 108. When the flush handle is depressed, or rotated, a rotational motion is imparted to the rocker arm 208 that causes the float 204 and stopper 202 to be lifted upwards, thereby enabling the tank 108 and bowl 106 to drain. Further details concerning operational aspects of example embodiments are discussed in connection with FIG. 2.

More specifically, the configuration and positioning of the rocker arm 208 may help ensure that the pull chain 210, float 204 and stopper 202 remain plumb, that is, oriented as shown in FIG. 1, during a flush operation. Put another way, the rocker arm 208 may help to ensure that the pull chain 210, float 204, and stopper 202, only move up and down in the vertical or Y-direction, and not laterally in the X-direction or Z-direction, during a flush operation. That is, some embodiments of the rocker arm 208 may have a generally hemispherical, or semicircular, shape. As well, the rocker arm 208 may have an axis of rotation 208a that is offset from a vertical axis of the float 204 and stopper 202 by a distance that is about equal to the radius of the rocker arm 208, as shown in FIG. 1. This configuration and arrangement of the rocker arm 208 may thus help to ensure that movement of the stopper 202 and float 204 during a flush operation is largely, or completely, confined to Y-direction motion.

The float 204 is configured to define a volume sufficiently large that if the water in the tank 108 should rise above the normal level for some reason, the float 204 will move upward, lifting the stopper 202 off the seat 110d, thereby enabling water to exit the tank 108 until the float 204 can descend and the stopper 202 is re-seated on the seat 110d. In this way, the float 204 may prevent against overfilling of the tank 108.

Finally, the example embodiment of FIG. 1 may further comprise a float valve 400 which, in general, controls the flow of water to the bowl 106 and tank 108 and, correspondingly, the level of water in the bowl 106 and the tank 108. The float valve 400 is connectible to a water supply line 402, such as from a house for example, and has an outlet connection 404 connected to fluid passageways 406 and 408 by way of which water may be supplied to the tank 108 and bowl 106, respectively. A float 410 is configured to move up and down, and thereby operate the float valve 400, as the water level in the tank 108 changes. Particularly, as the float 410 moves down, such as during a flushing operation, the float 410 causes the float valve 400 to open, and thereby admit water from the water supply line 402 to the outlet connection 404. As the tank 108 fills, the float 410 moves upwards, eventually causing the float valve 400 to close and thereby cut off the flow of water to the tank 108 and the bowl 106. The range of vertical motion of the float 410, as well as its uppermost and lowermost positions, may be adjustable, thereby enabling the water level in the tank 108 and bowl 106 to be set to a desired level.

D. Operational Aspects of Some Example Embodiments

Figure 2:
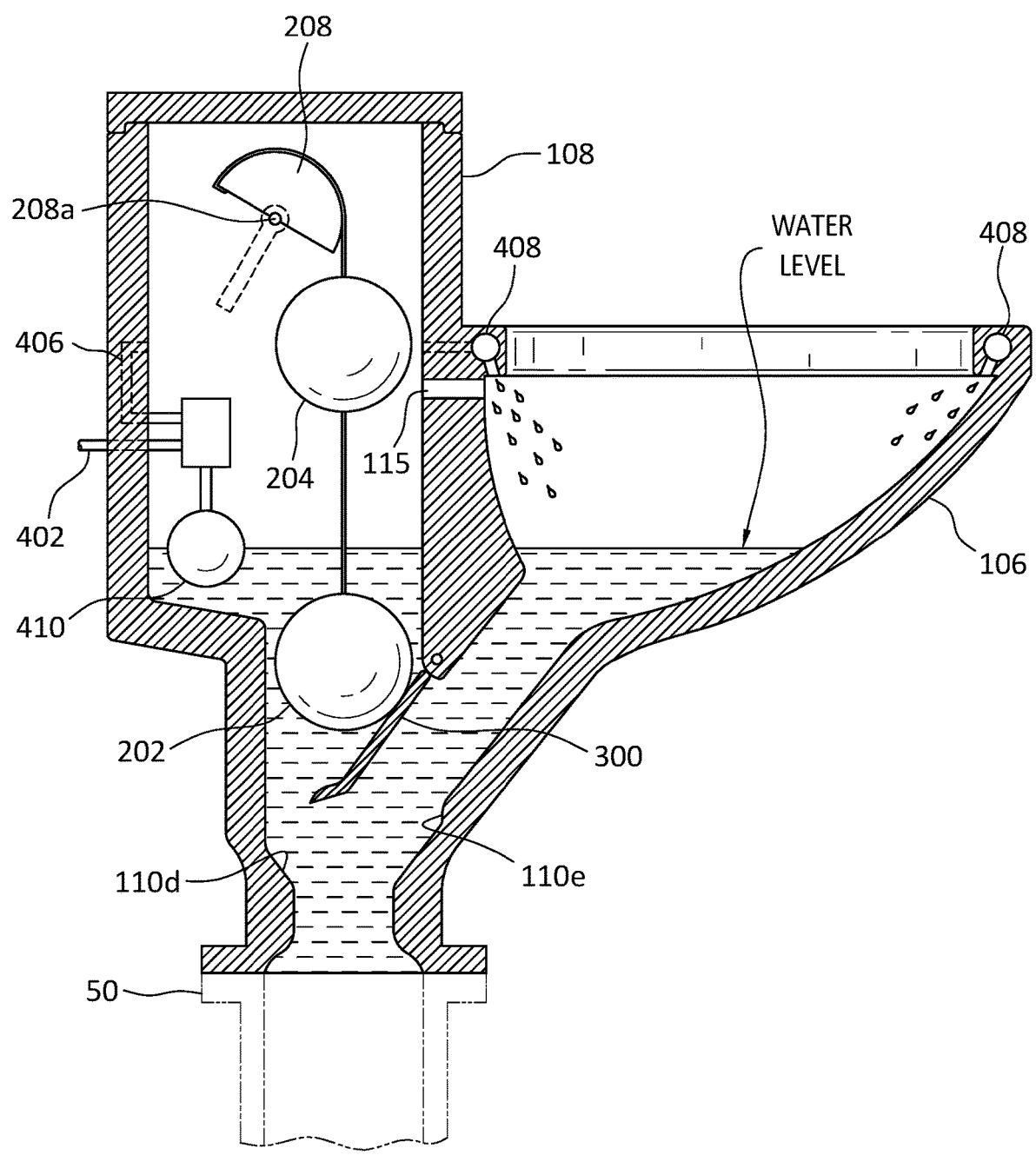
FIG. 2 discloses aspects of the embodiment of FIG. 1 in which the flushing mechanism has been activated.

With continued attention to FIG. 1, and directing attention now to FIG. 2 as well, details are provided concerning operational aspects of some example embodiments. Except as may be noted, the various components disclosed in FIG. 2 may be similar, or identical, to the components disclosed in FIG. 1.

As noted earlier, the disposition of the flush mechanism 200 disclosed in FIG. 1 may comprise a default state, that is, a rest state in which no flush operation is currently being performed and the flush mechanism 200 is able to be operated to perform a flush operation to drain the contents of the bowl 106. A flushing process may begin when a user operates a flush handle (not shown) located on an exterior of the tank 108 such as by depressing and/or rotating the flush handle. Because the flush handle may be connected either directly or indirectly to the rocker arm 208, such movement of the flush handle may cause movement, such as rotation about the pin 208a, of the rocker arm 208 as shown in FIG. 2. The range of motion of the rocker arm 208 about the pin 208a may be in a range of about 135 degrees to about 180 degrees. In other embodiments, the range of motion may be greater, or less, than about 135 degrees to about 180 degrees. The foregoing ranges of motion are presented by way of illustration and are not intended to limit the scope of the invention.

As shown in FIG. 1, the pull chain 210 may be connected at, or near, an edge of the rocker arm 208. Thus, as shown in FIG. 2, the rotation (counterclockwise in FIG. 2) of the rocker arm 208 during a flush operation may cause part of the pull chain 210 to be taken up onto the rocker arm 208. As a result, the float 204 is pulled upwards, and the stopper 202, connected to the float 204, is pulled upwards off the seat 110d, thus allowing the material in the bowl 106 to pass through the, now open, fluid passageway 114, into the lower end of the fluid passageway 116, and then exit the toilet 100 through the outlet 110.

As the stopper 202 is lifted upward in the fluid passageway 116 during the flushing operation, the stopper 202 pushes water upward in the fluid passageway 116 and the tank 108, creating a vacuum that may enable some or all of the water and waste in the bowl 106 and fluid passageway 114 to exit the outlet 110 ahead of at least some of the water in the tank 108. The delayed exit of at least some of the water from the tank 108 may then rinse the stopper 202 and seat 110d a second time following the evacuation of the bowl 106 and fluid passageway 114, ensuring that the bowl 106 and fluid passageway 114 are relatively clean before the stopper 202 descends and reseals with the seat 110d. As well, if the length of the fluid passageway 116 is shortened, a larger volume of water may pass from the tank 108 to the outlet 110 in a shorter amount of time, increasing the force, and effect, of the rinsing.

Due to the straight configuration, and relatively short length, of the passageway 114, the bowl 106 may be emptied relatively quickly during a flush operation. As material from the bowl 106 flows through the fluid passageway 114 under the influence of gravity, the flapper 300 is displaced off the seat 110e by the flowing material, as shown in FIG. 2. Thus positioned, the flapper 300 may shield the stopper 202 from the material flowing out of the bowl 106, and the flapper 300 may also direct the flow of material toward the outlet 110.

At the same time as the bowl 106 is emptying, water flows under the influence of gravity out of the tank 108 and through the outlet 110, thereby lowering the water level in the tank 108. The reduction in the water level in the tank 108 causes the float 410 to descend, thereby opening the float valve 400 so as to admit water from the water source through the water supply line 402 and into the fluid passageways 406 and 408. Water exits the fluid passageway 406 and passes into the tank 108. As well, the water admitted by the float valve 400 to the fluid passageway 408 passes through the fluid passageway 408 and into the bowl 106, cleaning and filling the bowl 106.

After the user releases the flush handle, and at about the same time as water is flowing into the tank 108 and bowl 106, the weighted stopper 202 begins to descend toward the position shown in FIG. 1. The flush handle and/or other portion of the flush mechanism may include a damping element 212 that controls the speed of the descent of the stopper 202. One example of such a damping element is a hinge spring, although other mechanisms may be used instead. Thus the speed of descent of the stopper 202 under the slowing influence of the damper is slower than the speed of descent would be if the stopper 202 were able to descend freely only under the influence of gravity. The damping effect may help to allow time for the bowl 106 to empty before refilling of the tank 108 and bowl 106 begins.

Eventually, the stopper 202 reaches the position shown in FIG. 1. For some period of time after the stopper 202 has achieved sealing contact with the seat 110d, water may continue to flow from the float valve 400 to the tank 108 and/or bowl 106. As the water level in the tank 108 continues to rise, the float 410, under the influence of the rising water, may continue to move upward until the water level reaches the point where the float 410 closes the float valve 400, thereby shutting off the flow of water to the tank 108 and the bowl 106. At this point, the flush mechanism 200 has fully returned to the default state. Note that when the flush mechanism 200 is in the default state, the respective water levels in the tank 108 and the bowl 106 settle at the same level as each other.

Figure 3:
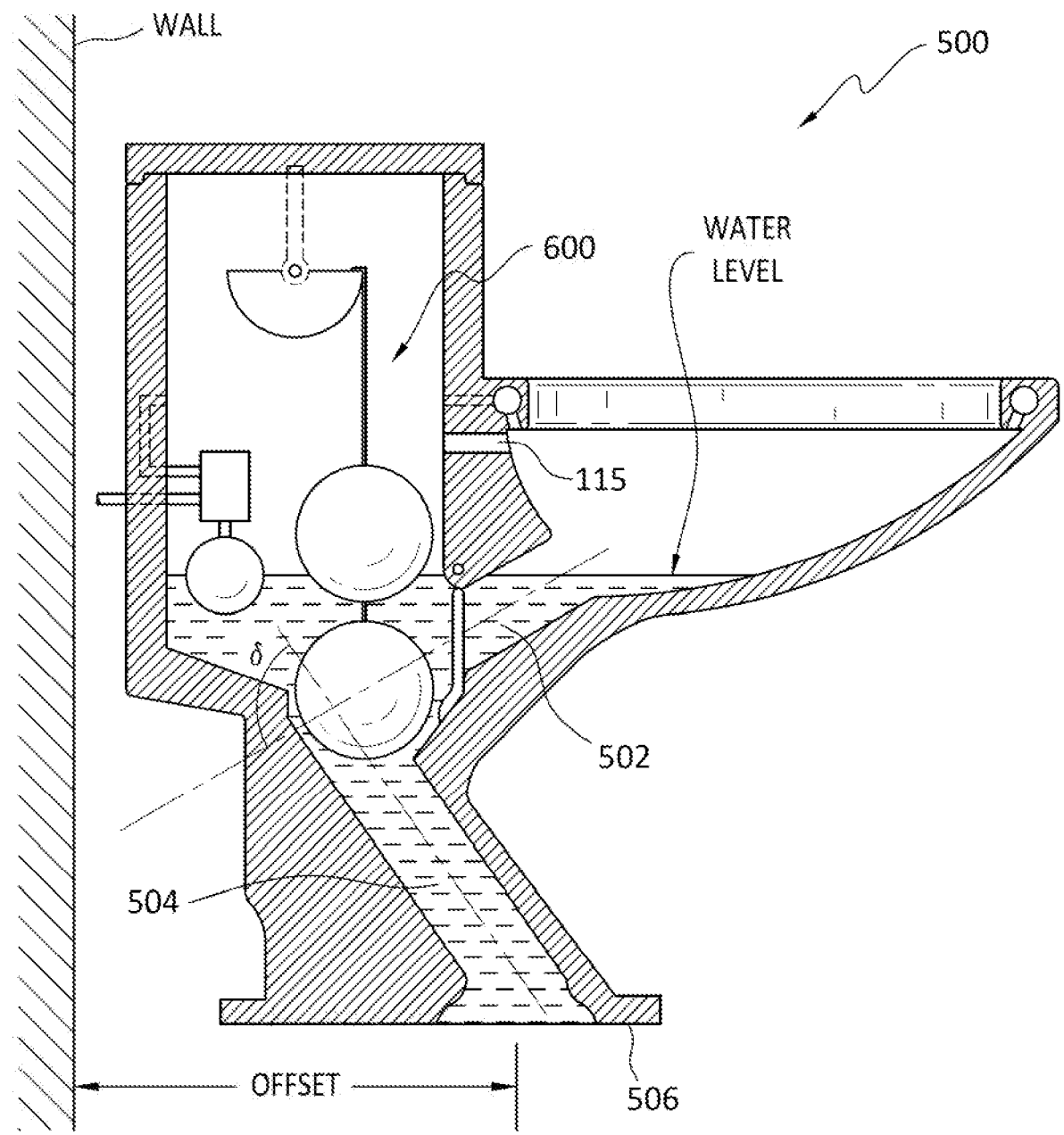
FIG. 3 discloses aspects of an alternative embodiment of a toilet with a flushing mechanism in a 'ready' configuration.

Directing attention now to FIG. 3, details are provided concerning an alternative embodiment of the invention, generally denoted at 500. Except as noted in the following discussion, the toilet 500 may be similar, or identical, to the toilet 100. For example, both the configuration and principle of operation of the flush mechanism 600 may be the same, or similar to, the configuration and principle of operation of the flush mechanism 200. In general, the primary difference of the toilet 500 with respect to the toilet 100 lies in the configuration and arrangement of the fluid passageway 502 and the fluid passageway 504.

Particularly, it can be seen that rather than extending downward in a generally vertical manner, the fluid passageway 504 may extend forward toward the front of the toilet 500, such that the fluid passageway 504 and fluid passageway 502 collective define an angle $\delta$. In some embodiments, the angle $\delta$ may be in the range of about 80-90 degrees. In other embodiments, the angle $\delta$ may be in the range of about 90-110 degrees, or greater than 110 degrees in still other embodiments. In general, it may be desirable to maximize the magnitude of the angle $\delta$ to the extent practical so as to reduce the likelihood of possible clogs. As well, the magnitude of the angle $\delta$ may affect the water level in the toilet 500, as seen by a comparison of FIGS. 1 and 2 with FIG. 3.

At $\delta$ angles of relatively smaller magnitude, the outlet flange 506 that mates with the home soil system may be positioned relatively closer to the front of the toilet 500, while at $\delta$ angles of relatively larger magnitude, the outlet flange 506 may be positioned relatively further away from the front of the toilet 500. Put another way, the magnitude of the $\delta$ angle may affect the offset of the toilet 500, that is, the minimum achievable distance between the center of the outlet flange 506 and a wall behind the toilet. The offset may be affected by other factors as well, such as the tank size and geometry.

Depending upon the embodiment, a relatively smaller offset may be desirable as it may mean that the toilet 500 does not protrude into the room as far as it would with a relatively larger offset. In some embodiments, such as the examples of FIGS. 1 and 2, the offset may be as small as 5 inches. In other embodiments, such as the example of FIG. 3, the offset may be about 11 inches+/−2 inches. These latter offset dimensions may make some embodiments of the invention, such as the example toilet 500 of FIG. 3, particularly well suited for installation with existing soil systems that typically have offsets in that range.

E. Other Considerations

As disclosed herein, and discussed below, example embodiments may comprise various features, some of which are addressed further hereafter, and any one or more of which may be incorporated in one or more embodiments.

For example, the weighted stopper included in at least some embodiments may eliminate the problem of evaporation of trap fluid, and consequent escape of sewage gas by maintaining a seal over the soil pipe opening without the need to retain water in a trap. As another example, the unibody design of some embodiments of the toilet may keep the water level in the bowl and tank at the same level. As well, and relative to conventional designs, example embodiments may flush faster, be easier to maintain, clean, install, and may eliminate potential clogs and bowl overflow. For example, the adjustable float may help to prevent the bowl and/or tank from overflowing, whether as the result of a clog in the bowl, or other condition, by pulling the stopper up off of its seat if the water rises above the desired preset level, emptying both the tank and bowl.

As another example, inasmuch as example embodiments omit a trap, the size of solid waste that can pass through the toilet is only limited by the size of the home soil pipe to which the outlet of the toilet is connectible. Further, in the event that a toilet according to example embodiments were to become clogged, the cause may be readily apparent, and accessible, since there are no blind corners or inaccessible areas between the bowl and house plumbing. As well, the relatively more direct path, as compared with conventional designs that employ a trap, from the bowl to the soil pipe in the floor may reduce the distance that water and waste have to travel, thereby increasing flush speed. Further as the waste may have a more direct exit, in example embodiments, the amount of waste that clings to the bowl and neck may also be reduced, relative to conventional configurations.

As another example, omission of an 'S' trap from example embodiments may also make installation of such embodiments easier, and the use of relatively fewer parts for the flush mechanism, and a smaller toilet body, may make example embodiments smaller, lighter, and easier to handle. For example, a straight line of sight through the tank to the closet flange on the floor may enable installers to visually align the closet flange and bolts without someone spotting from below. As well, example embodiments may reduce space and water requirements, relative to conventional toilet designs. As another example, omission of the 'S' trap from example embodiments may enable adjustments to the bowl location so that the overall depth of the toilet may be less than in conventional designs. Further, the relatively simple design of example embodiments may reduce, relative to conventional 'S' trap designs, the toilet size, required water capacity, and water consumption.

As some additional examples of features that may be included, example embodiments use only gravity, and do not employ a siphoning effect to any material extent, or at all in some embodiments, to flush. This approach may require less energy to perform the flush operation, and may result in relatively less water usage by such embodiments relative to conventional designs.

As some final examples, the adjustable float, which may be positioned inline with the stopper, may help to regulate the water level in the tank and/or in the bowl and may thus omit the need for a conventional tank overflow pipe. Example embodiments of the invention may employ a single piece toilet-and-tank construction and thus omit the use of separate respective tank and bowl assemblies. Thus, configurations according to example embodiments may eliminate the need for traditional flapper valves, flush valve gaskets, and mounting bolts between the tank and bowl, and may thus eliminate the potential leaks often associated with these components.

F. Further Example Embodiments

Following are some further example embodiments of the invention. These are presented only by way of example and are not intended to limit the scope of the invention in any way.

Embodiment 1. An apparatus, comprising: a porcelain body comprising: a tank that defines a first fluid passageway; and a bowl that is integral with the tank, and the bowl is connected with a second fluid passageway that intersects the first fluid passageway at an angle of less than 90 degrees, and the second fluid passageway is integral with the tank and the bowl.

Embodiment 2. The apparatus as recited in embodiment 1, further comprising an integral outlet located downstream of the intersection of the first fluid passageway and the second fluid passageway, wherein the outlet comprises a seat configured to receive a stopper, and the outlet is configured to mate with a soil drain.

Embodiment 3. The apparatus as recited in any of embodiments 1-2, wherein a portion of a third fluid passageway is defined in a wall of the tank, and a portion of a fourth fluid passageway is defined in a portion of the bowl.

Embodiment 4. The apparatus as recited in any of embodiments 1-3, wherein the first fluid passageway and the second fluid passageway each have a straight configuration that is free of bends.

Embodiment 5. The apparatus as recited in any of embodiments 1-4, further comprising a flapper rotatably connected to the body, and wherein the second fluid passageway defines a seat configured and arranged to make contact with a portion of the flapper.

Embodiment 6. The apparatus as recited in embodiment 5, wherein the flapper is configured to move between a first position where the flapper blocks the second passageway, and a second position where the second passageway is not blocked by the flapper.

Embodiment 7. An apparatus, comprising: a weighted stopper; a flexible connecting element having a first end connected to the weighted stopper; a float connected to a second end of the flexible connecting element; and a pull chain having a first end connected to the float.

Embodiment 8. The apparatus as recited in embodiment 7, further comprising a rocker arm, wherein a second end of the pull chain is configured to connect to the rocker arm.

Embodiment 9. The apparatus as recited in embodiment 8, wherein when the pull chain is suspended from the rocker arm, the weighted stopper is positioned below the float.

Embodiment 10. The apparatus as recited in any of embodiments 7-9, wherein a position of the float between the stopper and a second end of the pull chain is adjustable.

Embodiment 11. The apparatus as recited in any of embodiments 7-10, further comprising a damper that controls a rate of rotation of the rocker arm.

Embodiment 12. The apparatus as recited in any of embodiments 7-11, wherein the stopper is configured to make sealing contact with a seat defined by an outlet of a toilet.

Embodiment 13. An apparatus, comprising: a porcelain body comprising: a tank that defines a first fluid passageway; a bowl that is integral with the tank, and the bowl is connected with a second fluid passageway that intersects the first fluid passageway at an angle of less than 90 degrees, and the second fluid passageway is integral with the tank and the bowl; and an integral outlet located downstream of the intersection of the first fluid passageway and the second fluid passageway, wherein the outlet comprises a seat, and the outlet is configured to mate with a soil drain; and a flush mechanism disposed inside the porcelain body, and comprising: a weighted stopper configured to make sealing contact with the seat of the outlet; a flexible connecting element having a first end connected to the weighted stopper; a float connected to a second end of the flexible connecting element; a pull chain having a first end connected to the float; and a rocker arm rotatably connected to the body, wherein the rocker arm is connected to a second end of the pull chain.

Embodiment 14. The apparatus as recited in embodiment 13, wherein the first fluid passageway and the second fluid passageway each have a straight configuration that is free of bends.

Embodiment 15. The apparatus as recited in any of embodiments 13-14, further comprising a flapper rotatably connected to the body, and wherein the second fluid passageway defines a seat configured and arranged to make contact with a portion of the flapper.

Embodiment 16. The apparatus as recited in embodiment 15, wherein the flapper is configured to move between a first position where the flapper blocks the second passageway, and a second position where the second passageway is not blocked by the flapper, and when the flapper is in the first position, the flapper is prevented by the stopper from moving to the second position.

Embodiment 17. The apparatus as recited in any of embodiments 13-16, further comprising a float valve disposed in the tank and connectible to a water supply.

Embodiment 18. The apparatus as recited in any of embodiments 13-17, wherein the stopper is positioned below the float.

Embodiment 19. The apparatus as recited in any of embodiments 13-18, further comprising a damper that controls a rate of rotation of the rocker arm.

Embodiment 20. The apparatus as recited in any of embodiments 13-19, wherein during a flush operation, the rocker arm takes up a portion of the pull chain so as to lift the stopper off of the seat of the outlet, and enable the tank and the bowl to drain.

Embodiment 21. Any combination of any one or more of embodiments 1-6 with any one or more of embodiments 7-12.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
  a porcelain body comprising:
    a tank that defines a first fluid passageway; and
    a bowl that is integral with the tank, and the bowl is connected with a second fluid passageway that intersects the first fluid passageway at an angle of less than 90 degrees, and the second fluid passageway is integral with the tank and the bowl; and
  a flapper rotatably connected to the porcelain body, and wherein the second fluid passageway defines a seat configured and arranged to make contact with a portion of the flapper.

2. The apparatus as recited in claim 1, further comprising an integral outlet located downstream of a location where the first fluid passageway and the second fluid passageway intersect, wherein the integral outlet comprises a seat configured to receive a stopper, and the integral outlet is configured to mate with a soil drain.

3. The apparatus as recited in claim 1, wherein a portion of a third fluid passageway is defined in a wall of the tank, and a portion of a fourth fluid passageway is defined in a portion of the bowl.

4. The apparatus as recited in claim 1, wherein the first fluid passageway and the second fluid passageway each have a straight configuration that is free of bends.

5. The apparatus as recited in claim 1, wherein the flapper is configured to move between a first position where the flapper blocks the second passageway, and a second position where the second passageway is not blocked by the flapper.

6. An apparatus, comprising:
  a weighted stopper that is configured to make sealing contact with a seat defined by an outlet of a toilet;
  a flexible connector having a first end connected to the weighted stopper;
  a float connected to a second end of the flexible connector; and
  a pull chain having a first end connected to the float.

7. The apparatus as recited in claim 6, further comprising a rocker arm, wherein a second end of the pull chain is configured to connect to the rocker arm.

8. The apparatus as recited in claim 7, wherein when the pull chain is suspended from the rocker arm, the weighted stopper is positioned below the float.

9. The apparatus as recited in claim 6, wherein a position of the float between the weighted stopper and a second end of the pull chain is adjustable.

10. The apparatus as recited in claim 6, further comprising a damper that controls a rate of rotation of the rocker arm.

11. An apparatus, comprising:
  a porcelain body comprising:
    a tank that defines a first fluid passageway;
    a bowl that is integral with the tank, and the bowl is connected with a second fluid passageway that intersects the first fluid passageway at an angle of less than 90 degrees, and the second fluid passageway is integral with the tank and the bowl; and
    an integral outlet located downstream of a location where the first fluid passageway and the second fluid passageway intersect, wherein the integral outlet comprises a seat, and the integral outlet is configured to mate with a soil drain; and
  a flush mechanism disposed inside the porcelain body, and comprising:
    a weighted stopper configured to make sealing contact with the seat of the integral outlet;
    a flexible connector having a first end connected to the weighted stopper;
    a float connected to a second end of the flexible connector;
    a pull chain having a first end connected to the float; and
    a rocker arm rotatably connected to the body, wherein the rocker arm is connected to a second end of the pull chain.

12. The apparatus as recited in claim 11, wherein the first fluid passageway and the second fluid passageway each have a straight configuration that is free of bends.

13. The apparatus as recited in claim 11, further comprising a flapper rotatably connected to the body, and wherein the second fluid passageway defines a seat configured and arranged to make contact with a portion of the flapper.

14. The apparatus as recited in claim 13, wherein the flapper is configured to move between a first position where the flapper blocks the second passageway, and a second position where the second passageway is not blocked by the flapper, and when the flapper is in the first position, the flapper is prevented by the stopper from moving to the second position.

15. The apparatus as recited in claim 11, further comprising a float valve disposed in the tank and connectible to a water supply.

16. The apparatus as recited in claim 11, wherein the stopper is positioned below the float.

17. The apparatus as recited in claim 11, further comprising a damper that controls a rate of rotation of the rocker arm.

18. The apparatus as recited in claim 11, wherein during a flush operation, the rocker arm takes up a portion of the pull chain so as to lift the stopper off of the seat of the outlet, and enable the tank and the bowl to drain.

* * * * *